(No Model.)
C. F. PIKE.
WATER CLOSET.
No. 271,916. Patented Feb. 6, 1883.
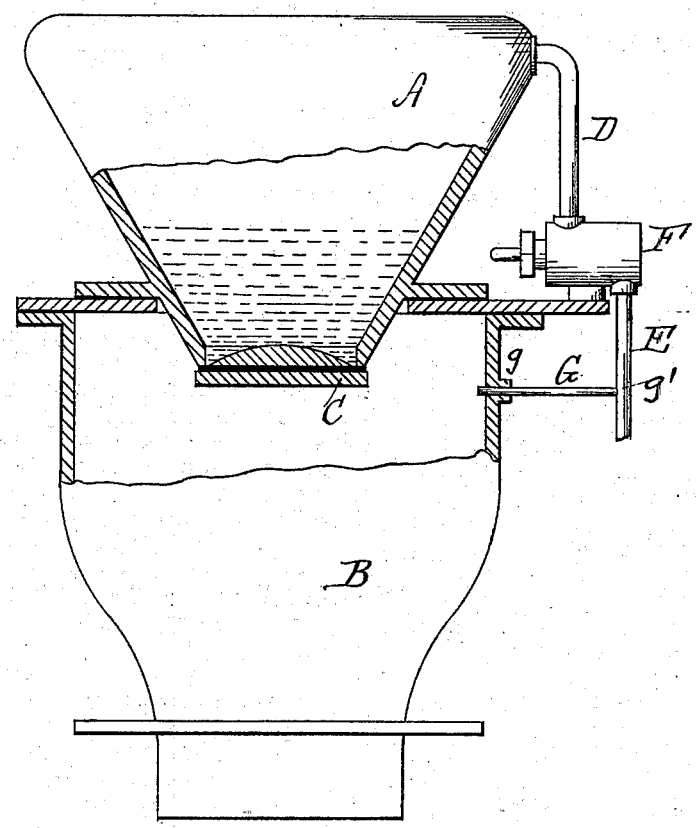
Witnesses:
Chas. F. Van Horn
W. H. Van Horn
Inventor,
Charles F. Pike
By S. J. Van Stavoren
Attorney.

UNITED STATES PATENT OFFICE.

CHARLES F. PIKE, OF PHILADELPHIA, PENNSYLVANIA, ASSIGNOR TO THE NATIONAL ANTI-SEWER GAS COMPANY, OF CAMDEN, NEW JERSEY.

WATER-CLOSET.

SPECIFICATION forming part of Letters Patent No. 271,916, dated February 6, 1883.

Application filed August 7, 1882. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Water-Closets, of which the following is a specification, reference being had therein to the accompanying drawing, wherein the figure is an elevation, partly sectional, of a water-closet embodying my invention.

My invention has relation to water-closets, and has for its object to provide a closet of the ordinary construction having the usual water seal for the bowl, with means for effecting a continuous flow of water to the container or receiver, so that any sewer-gas escaping from the soil pipe or trap of the closet into said container will be absorbed by said flow of water and be carried off to the soil-pipe.

My invention accordingly consists of a water-closet having a container provided with a pipe having connection with the water-supply pipe of the closet, whereby a flow of water continuously passes to the container.

Referring to the accompanying drawing, A represents the bowl of a water-closet, B the container, and C the clapper or pan, which are designed to be constructed in the usual manner, said clapper or pan C having operating mechanism of substantially the form as shown in applications of even date herewith, or in that filed by me October 5, 1881, and need not therefore be herein described, as I make no claim thereto in this application.

D represents the flushing-pipe, E the water-supply pipe, and F the cock therefor.

G is a pipe, connected at $g$ to the retainer and at $g'$ to pipe E. I prefer to have the pipe G of a bore very much smaller than that of the water-supply pipe, so that a small flow of water only can pass therethrough; but said pipe G may, if desired, be increased in diameter to any suitable extent. As the water from pipe G enters the container it absorbs any and all sewer-gas or excrementitious odors therein, and, falling into the trap below, forms a running-water seal therefor to prevent sewer-gas passing through said trap. The provision of pipe G permits my present invention to be applied to water-closets already in use without involving much labor or expense, for all that needs to be done is to tap a hole in the container and in the water-supply pipe, secure said pipe thereto, and a running-water seal is provided for the container.

What I claim as my invention is—

The combination, in a water-closet having bowl and container, of a pipe, G, connected to said container, and with the water-supply pipe for said bowl, substantially as shown and described, whereby a flow of water continuously passes to the container, substantially as set forth.

In testimony whereof I affix my signature in presence of two witnesses.

CHARLES F. PIKE.

Witnesses:
   S. J. VAN STAVOREN,
   CHAS. F. VAN HORN.